Dec. 25, 1945. J. B. KUCERA 2,391,427
MACHINE FOR TURNING WINDROWED HEMP AND THE LIKE
Filed Jan. 20, 1943 2 Sheets-Sheet 1
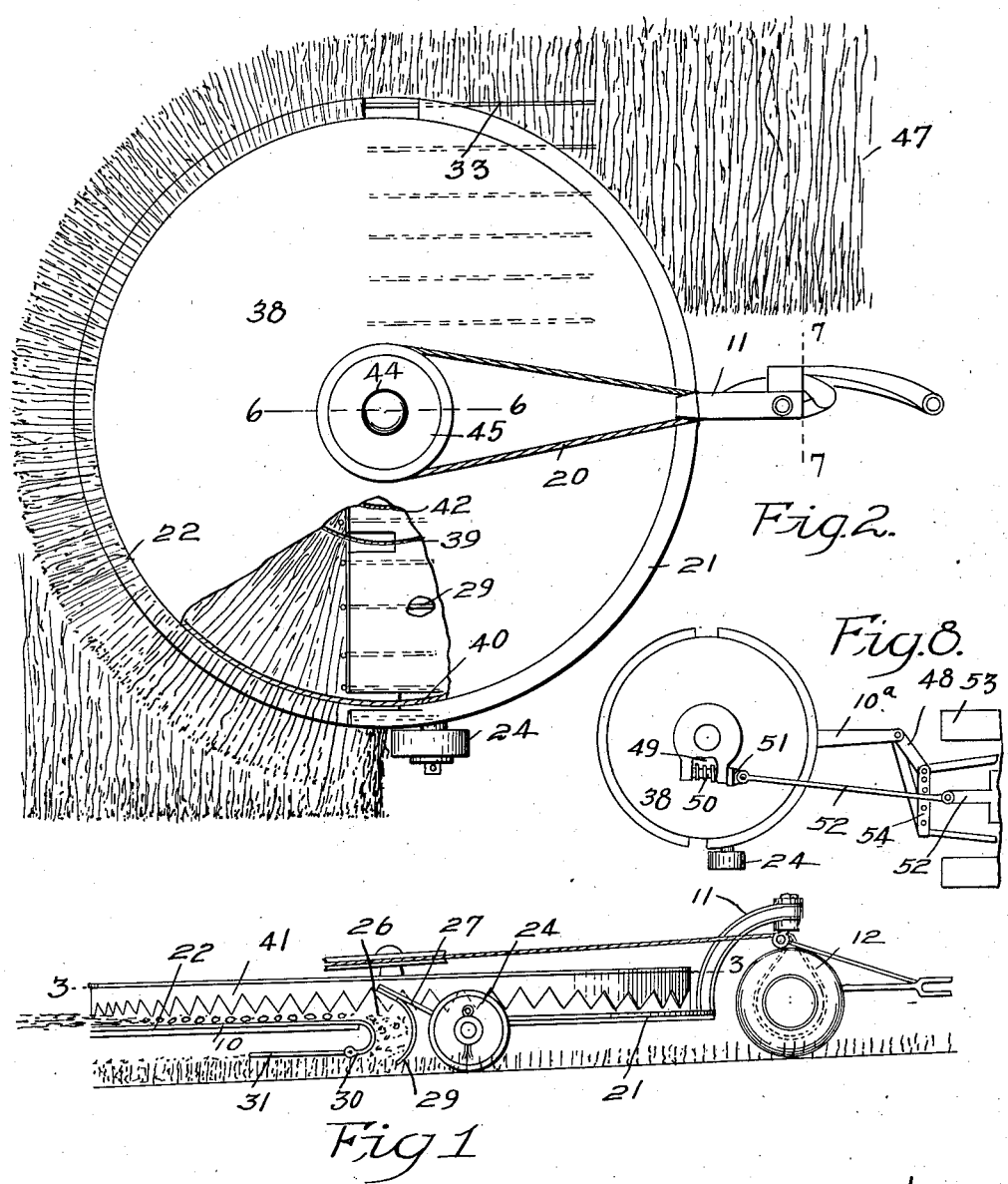

Dec. 25, 1945. J. B. KUCERA 2,391,427
MACHINE FOR TURNING WINDROWED HEMP AND THE LIKE
Filed Jan. 20, 1943 2 Sheets-Sheet 2
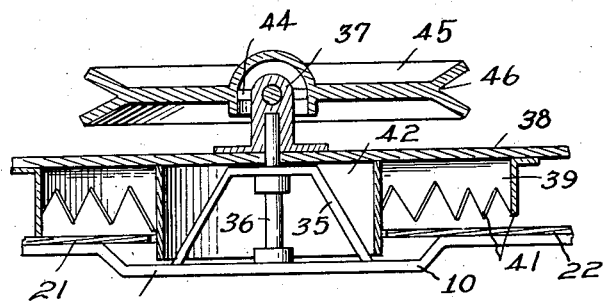
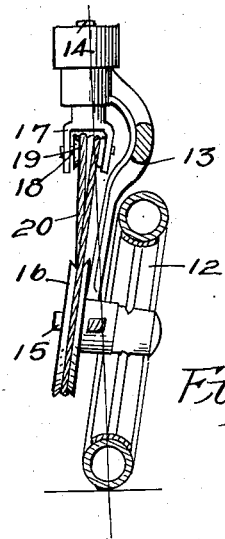
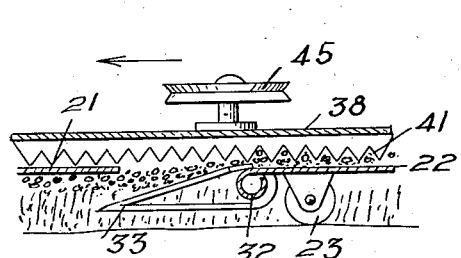
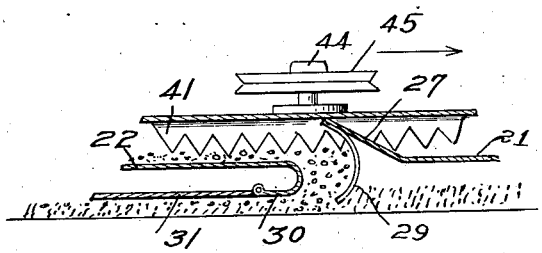
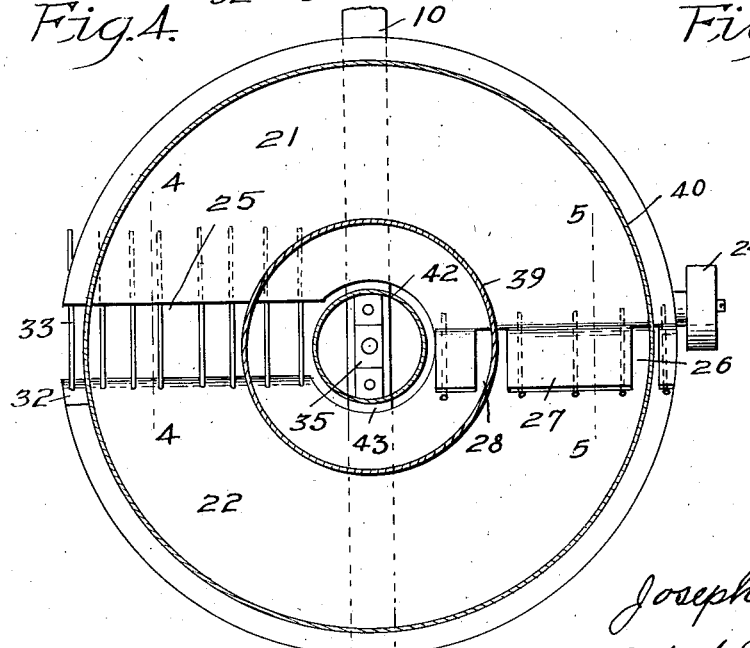
Inventor
Joseph B. Kucera
by Alfred G. Hague atty

Patented Dec. 25, 1945

2,391,427

UNITED STATES PATENT OFFICE 2,391,427

MACHINE FOR TURNING WINDROWED HEMP AND THE LIKE

Joseph B. Kucera, Traer, Iowa

Application January 20, 1943, Serial No. 472,975

7 Claims. (Cl. 56—370)

This invention relates to harvesting hemp. In the harvesting of the green upstanding stalks of hemp, the hemp is first cut and arranged in windrows with the stalks transversely of the windrow and the butts of the stalks all in one direction, the hemp being laid on the stubble to dry. After it has dried a few days it is necessary then to invert or turn the windrows of hemp over so as to permit the under side to also become dried. Heretofore this turning or inverting of the hemp has been done manually, which is a slow and laborious process, especially when the operation is done on windy days, inasmuch as the hemp stalks are often from ten to fifteen feet long. It is very desirable that the stalks, when turned over, are again arranged with the stalks parallel to each other and transverse of the row. This is a very difficult thing to do in high winds.

It is, therefore, the object of my invention to provide a simple, durable and inexpensive mechanical means for turning the swaths of hemp to inverted positions, which may be attached to a tractor or drawn by draft animals, so that the work may be more accurately and rapidly accomplished.

A further object is to provide in a hemp-turning machine employing a rotatably mounted head and a steerable traction wheel, improved means for transmitting power from the steerable traction wheel to operate said rotatable head.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved hemp turning machine;

Figure 2 is a top view of the same;

Figure 3 is a horizontal sectional view taken on the line 3—3 of Figure 1;

Figure 4 is a detail sectional view taken on the line 4—4 of Figure 3;

Figure 5 is a detail sectional view taken on the line 5—5 of Figure 3;

Figure 6 is an enlarged detail sectional view taken on the line 6—6 of Figure 2;

Figure 7 is an enlarged detail sectional view taken on the line 7—7 of Figure 2;

Figure 8 is a plan view of a slightly modified form of my device which is particularly adapted to be used in connection with a farm tractor.

My improved invention comprises a longitudinally extending bar 10 which is utilized to form the portion of the frame work having at its forward end an upwardly and forwardly extending bracket 11 to which a steerable tractor wheel 12 is pivotally supported by means of a bracket 13 and a pivot member 14, the wheel 12 being preferably inclined so that that portion of the tire of the wheel engaging the ground surface will be vertically beneath the pivot center of the shaft 14. The wheel 12 is provided with an axle 15 on which is supported a sheave 16. Supported pivotally on the lower end of the shaft 14 is a bracket 17 supporting a shaft 18 on which are mounted small pulley wheels 19 for the purpose of directing a rope 20 or similar drive over and around the sheave 16 for the purpose of operating the rotor head hereinafter to be described. It will be noted that by this arrangement the wheel 12 may be steered at various angles relative to the frame, without materially increasing or decreasing the tension of the rope.

Supported on the bar 10 is a pair of substantially semi-annular platforms 21 and 22 (see Fig. 3), said platforms being supported substantially in the same horizontal plane and carried by means of wheels 23 and 24. The chord or diametrical edges of the platforms are spaced apart a slight distance to provide an inlet passage 25 and an outlet passage 26. The rear edge of the platform 21 adjacent to the passage 26 is extended upwardly and rearwardly over said passage to form a stripper 27, said stripper having notches 28 for the purpose hereinafter made clear, the strippers being provided with forwardly and downwardly curved guards 29. The forward edge of the delivery side of the platform 22 is provided with a downwardly and rearwardly curved portion 30 supported above the ground surface a slight distance, the rear edge of the member 30 having pivotally connected thereto a float 31. The forward edge of the receiving end of the platform 22 is provided with a transversely arranged tubular member 32, to which are connected forwardly projecting gathering tines 33.

The central portion of the member 10 is provided with a downwardly formed portion 34 in which is mounted a bracket 35 for supporting an upright and rotatably mounted shaft 36, the upper end of the shaft 36 having a hub 37 to which a disc 38 is secured, said disc being provided with annular strips 39 and 40, the lower edges of these strips being provided with teeth 41. The central portion of the disc 38 is also provided with a downwardly extending drum 42 operating in the notches 43 of the platforms 21 and 22, with the lower end of the drum 42 below the said platforms 21 and 22, as clearly illustrated in Figure 6. The upper end of the hub 37 supports a universal joint 44 on which a sheave 45 is mounted, the pivotal centers of the joint 44 being in a plane common to the bottom of the groove 46. The sheave 45 supports the rope 20, thus providing means whereby when the machine is advanced over the ground surface, the tractor wheel 12 will be rotated, which in turn will cause the rope 20 to be operated and the disc 38 rotated in an anti-clockwise direction, as viewed in Figure 2. By this arrangement it will be seen that if the machine is advanced along a swath of hemp 47 adjacent to that side of the swath supporting the butt ends of the hemp in the manner illustrated in Figure 2, with the gathering tines 32 passing beneath the hemp, it will cause the hemp to be delivered to the top surface of the forward edge of the platform 22. As illustrated in Figure 4 the disc 38 at the same time being rotated, will cause the teeth 41 to engage the material as it is delivered on to said platform and then to be moved in a semi-circular path to the discharge passage 26 beneath the strippers 27. The material will then fall by gravity through said opening against the guides 29 and beneath the member 30 and the float 31. This will cause the swath of hemp to be inverted or delivered again to the ground surface with its opposite side up from that in which it was when it was engaged by the gathering tines 33, the drum 42 serving as a guide against which the butts of the stalks 47 may be encountered. The float 31 serves to somewhat compact the hemp as it is delivered to the ground surface in such a manner that it will not be so easily picked up by the wind. Under certain conditions, however, this float may not be necessary.

By providing the lower platforms 21 and 22 and the disc 38 supported above said platforms a slight distance and then feeding the hemp to position under the teeth 41, it will be seen that the plate and platform serve to cover and protect a major portion of the hemp against being blown away by the wind, and that the swath of hemp will be delivered to the ground surface in an inverted position without materially disturbing or tearing apart the parallel arrangement of the stalks. This provides means whereby the hemp may be easily and quickly turned over, even if the butt ends of the stalks are interwoven with weeds and vines, without difficulty, and whereby the operation may be easily and quickly accomplished. The device is very simple, requiring a minimum of moving parts, and may be constructed either of wood or sheet metal.

In Figure 8 I have illustrated a slightly modified form wherein the tractor wheel 12 is entirely eliminated and the frame member 10a is extended forwardly and provided with a coupling device 48 by means of which the forward end of the frame may be carried and by means of which power may be transmitted to advance the machine over the ground surface.

In place of the sheave 45 a worm gear 49 may be operated by worm gears 50 supported on the shaft 51, said shaft 51 being operated from a power take-off shaft 52 of a tractor 53, the coupling 48 being offset from the tractor hitch 54 to permit the tractor to be operated without running over the swath of hemp.

Thus, it will be seen I have provided a machine for turning swathed hemp which may be easily and quickly and inexpensively operated and wherein the hemp may be turned without greatly disturbing the relationship of the stalks, one relative to the other.

I claim as my invention:

1. A hemp turner, comprising front and rear semi-circular platforms supported substantially in the same plane, said platforms being spaced apart to provide inlet and outlet passages between them, arranged transversely of a line of advance, means supported at the inlet side of the forward edge of the rear platform for elevating and delivering hemp to the top surface of said rear platform through said inlet passage, a rotary head above, parallel and concentric with the upper surfaces of said platforms, hemp-engaging means depended from said rotary head and terminating above said platform, with the hemp at said inlet passage being engaged and moved by said hemp-engaging means in a substantially semi-circular path on said rear platform for delivery to the ground through said outlet passage.

2. A hemp turner, comprising front and rear semi-annular platforms supported in a substantially common plane, said platforms being spaced apart to provide inlet and outlet passages at opposite sides of said platforms and a substantially circular opening at the center of said platforms, means supported by the inlet side of the front edge of the rear platform for elevating and delivering hemp to the top surface of said rear platform through said inlet passage, a rotatably mounted member supported above, parallel and concentrically with the upper surfaces of said platforms, a downwardly projected drum from the central portion of said rotatably mounted member extended through the central opening of said platforms, a plurality of annular rows of depended teeth supported by said rotatably mounted member and concentrically with said downwardly projected drum, the lower ends of said teeth terminating above said platforms, and means for rotating said rotatably mounted member, with the hemp at said inlet passage being engaged by said teeth and moved through a semi-circular path on said rear platform for delivery to the ground through said outlet passage.

3. A machine for turning over windrowed hemp comprising a portable frame, hemp conveying means on said frame including a continuous hemp supporting surface having oppositely arranged forward ends, with one of said forward ends constituting a hemp receiving portion and the other of said forward ends a hemp discharge portion, with said forward ends being substantially 180° apart, pick-up means operatively associated with said receiving portion for gathering and delivering hemp to said receiving portion, and means rotatably supported on said frame for moving the hemp supported on said hemp supporting surface from said receiving portion to said discharge portion for delivery to the ground.

4. A machine for turning over windrowed material including a frame to be advanced over the ground, a material supporting member on the frame having a material receiving portion and a material discharge portion oppositely arranged on the forward side of said supporting member, means rotatable in a plane parallel to said supporting member, material engaging means on said rotatable means extended toward said supporting member, and pick-up means supported on said frame for gathering and delivering material to said receiving portion, with the material at said receiving portion being engaged by said extended means and moved on said supporting member in an arcuate path of substantially 180° to said discharge portion for delivery to the ground.

5. A hemp turning machine including a frame adapted to be advanced over the ground surface, a platform of substantially semi-circular shape supported on said frame, with the forward side of said platform being straight and transversely extended relative to the line of advance of said frame, with one end of said forward side constituting a hemp-receiving portion, and an opposite end a hemp discharge portion, rotary means supported in a spaced relation above said platform, hemp-engaging means depended from said rotary means and rotatable in a path concentric with said platform, and pick-up means supported on said frame for delivering hemp to said receiving portion in a position transverse to said line of advance, with the hemp, at said receiving portion, being engaged by said depended means and moved about said platform to said discharge portion to a position substantially parallel with the hemp at said receiving portion, with said depended means moving the hemp from the platform at said opposite portion for delivery to the ground.

6. A machine for turning over windrowed hemp including a frame to be advanced over the ground, a hemp-supporting platform on the frame having a hemp-receiving portion and a hemp-discharging portion oppositely arranged on said frame, with the forward ends of said two portions extended transversely to the line of advance of said frame, and the angular distance between the forward ends of said two portions being substantially 180°, rotary means supported in a spaced relation above said platform having hemp-engaging means suspended therefrom, pick-up means supported on said platform for gathering hemp from a windrow and delivering it to said receiving portion with the hemp disposed radially of said rotary means and transversely of said line of advance, with the hemp at said receiving portion being engaged by said suspended means and moved on said platform in an arcuate path to said discharge portion in a position transverse of said line of advance, with said suspended means being adapted to move the hemp over the forward end of said discharge portion for delivery to the ground.

7. A machine for turning over windrowed hemp including a frame to be advanced over the ground, a hemp-supporting member on the frame having a hemp-receiving portion and a hemp-discharge portion oppositely arranged on said member, means rotatable in a plane parallel to said hemp-supporting member, hemp-engaging means on said rotatable means extended toward said supporting member, pick-up means supported on said frame for gathering hemp from a windrow of hemp to be turned and delivering it to said receiving portion with the hemp disposed radially of said rotatable means and transversely of said line of advance, the hemp at said receiving portion being engaged by said extended means and moved on said supporting member in an arcuate path of substantially 180° to said discharge portion so that the hemp at said discharge portion is positioned transversely of said line of advance, with the advance of said frame providing for the hemp falling to the ground from said discharge portion to form a windrow laterally spaced from the windrow of hemp being gathered, and with the hemp in a turned-over position.

JOSEPH B. KUCERA.